US012014694B1

(12) United States Patent
Eun

(10) Patent No.: US 12,014,694 B1
(45) Date of Patent: Jun. 18, 2024

(54) PASSENGER GUIDE DEVICE FOR BUS STOP

(71) Applicant: SAITEC INC., Jeollanam-do (KR)

(72) Inventor: Nam Pyo Eun, Gwangju (KR)

(73) Assignee: SAITEC INC., Jeollanam-Do (KR)

( * ) Notice: Subject to any disclaimer, the term of this patent is extended or adjusted under 35 U.S.C. 154(b) by 0 days.

(21) Appl. No.: 18/206,197

(22) Filed: Jun. 6, 2023

(30) Foreign Application Priority Data

Apr. 20, 2023 (KR) ........................ 10-2023-0052199

(51) Int. Cl.
*G09G 3/34* (2006.01)
*G08G 1/127* (2006.01)
*G09G 3/36* (2006.01)

(52) U.S. Cl.
CPC ............. *G09G 3/342* (2013.01); *G08G 1/127* (2013.01); *G09G 3/36* (2013.01); *G09G 2320/041* (2013.01); *G09G 2320/0626* (2013.01); *G09G 2320/0686* (2013.01); *G09G 2354/00* (2013.01); *G09G 2360/144* (2013.01); *G09G 2360/16* (2013.01)

(58) Field of Classification Search
CPC .... G09G 3/342; G09G 3/36; G09G 2320/041; G09G 2320/0626; G09G 2320/0686; G09G 2354/00; G09G 2360/144; G09G 2360/16; G08G 1/127
See application file for complete search history.

(56) References Cited

U.S. PATENT DOCUMENTS

| | | | | |
|---|---|---|---|---|
| 2011/0149180 | A1* | 6/2011 | Ichioka | G09G 5/00 348/836 |
| 2017/0213523 | A1* | 7/2017 | Liu | G09G 5/10 |
| 2019/0121199 | A1* | 4/2019 | Lin | G02B 6/0025 |
| 2020/0051503 | A1* | 2/2020 | Qin | G09G 3/3233 |
| 2020/0051508 | A1* | 2/2020 | Tan | G09G 3/3291 |
| 2020/0051512 | A1* | 2/2020 | Li | G09G 3/3607 |
| 2020/0051513 | A1* | 2/2020 | Fattal | H04N 13/359 |
| 2022/0122553 | A1* | 4/2022 | Wooster | G09G 5/10 |

FOREIGN PATENT DOCUMENTS

KR 10-0847350 B1 7/2008

* cited by examiner

*Primary Examiner* — Sejoon Ahn
(74) *Attorney, Agent, or Firm* — Eric L. Lane; Green Patent & IP Law

(57) ABSTRACT

The present invention relates to a passenger guide device for a bus stop, which includes divided backlight modules that irradiates light by dividing a display screen region, a display panel that displays display information by the light irradiated from the divided backlight modules, an external illuminance detector that is installed along an edge outside a display screen region of the display panel and detects external illuminance, and a control module that controls the display panel so that received bus service display information is displayed on the display panel, and controls operations of the divided backlight modules according to the illuminance detected by the external illuminance detector.

9 Claims, 4 Drawing Sheets

PASSENGER GUIDE DEVICE FOR BUS STOP

CROSS-REFERENCE TO RELATED APPLICATIONS

This application claims priority to and the benefit of Korean Patent Application No. 10-2023-0052199 filed in the Korean Intellectual Property Office on Apr. 20, 2023, the entire contents of which are incorporated herein by reference.

TECHNICAL FIELD

The present invention relates to a passenger guide device for a bus stop, and more particularly, to a passenger guide device for a bus stop that operates to be able to improve a contrast ratio according to external illuminance.

BACKGROUND ART

In recent years, a bus information system (BIS) that provides bus service information in a jurisdiction has been established and used.

The bus information system is a system that collects locations of buses in service in real time from a traffic information center, generates traffic information such as an expected time of arrival at a bus stop, a location of a bus currently in service by route, a distance from a bus behind and transfer information, and provides the generated traffic information through each stop guide machine or provides the same to a personal terminal user through an internet network.

Such a bus information system has been variously proposed, such as Korean Patent Registration No. 10-0847350.

In the bus information system, a bus stop guide machine installed at a bus stop mostly adopts, as a display device for displaying the traffic information, an LCD display device, and displays the information in a high brightness state, so the use life is not long.

In addition, when the bus stop guide machine is configured to control light emission brightness for an entire display region of the bus stop guide machine under the same condition, there is a disadvantage in that sufficient visibility cannot be partially provided if only a part of the display region of the bus stop guide machine is shaded during the daytime.

SUMMARY OF THE INVENTION

The present invention has been made in view of the above situations, and an object thereof is to provide a passenger guide device for a bus stop that can improve a contrast ratio of a display panel installed at the bus stop and extend the use life.

Technical Solution

In order to achieve the above object, a passenger guide device for a bus stop according to the present invention includes a display panel installed at a bus stop and including divided backlight modules configured to be able to irradiate light by dividing a display screen region, and a liquid crystal display module configured to display display information by the light irradiated from the divided backlight modules; an external illuminance detector including a plurality of illuminance sensors installed spaced apart from each other along an edge outside the display screen region of the display panel and configured to detect external illuminance; and a control module configured to control the display panel so that bus service display information received through a terminal communication unit is displayed on the display panel, and to control operations of the divided backlight modules according to the illuminance detected by the external illuminance detector.

In addition, the display panel may include a first divided backlight module responsible for an upper left region among four regions divided into an upper left region, an upper right region, a lower left region, and a lower right region with respect to the display screen region, a second divided backlight module responsible for the upper right region, a third divided backlight module responsible for the lower left region, and a fourth divided backlight module responsible for the lower right region, and the external illuminance detector may include a first illuminance sensor installed at a vertically corresponding position along a center of the first divided backlight module, in an upper edge region of the display panel, a second illuminance sensor installed at a vertically corresponding position along a center of the second divided backlight module, in an upper edge region of the display panel, a third illuminance sensor installed at a vertically corresponding position along a center of the third divided backlight module, in a lower edge region of the display panel, a fourth illuminance sensor installed at a vertically corresponding position along a center of the fourth divided backlight module, in a lower edge region of the display panel, a fifth illuminance sensor installed at a horizontally corresponding position along the center of the first divided backlight module, in a left edge region of the display panel, a sixth illuminance sensor installed at a horizontally corresponding position along the center of the second divided backlight module, in a right edge region of the display panel, a seventh illuminance sensor installed at a horizontally corresponding position along the center of the third divided backlight module, in a left edge region of the display panel, and an eighth illuminance sensor installed at a horizontally corresponding position along the center of the fourth divided backlight module, in a right edge region of the display panel.

According to one aspect of the present invention, the control module may be configured, when illuminances detected by the first illuminance sensor, the second illuminance sensor, the fifth illuminance sensor and the sixth illuminance sensor in a set daytime time zone are all detected as being equal to or less than a set first daytime reference illuminance, to determine light emission brightnesses of the first and second divided backlight modules, based on a lower average illuminance value, which is an average value of two lowest luminance values of a first illuminance value detected by the first illuminance sensor, a second illuminance value detected by the second illuminance sensor, a fifth illuminance value detected by the fifth illuminance sensor and a sixth illuminance value detected by the sixth illuminance sensor, and to control the operations of the first and second divided backlight modules according to the determined light emission brightnesses.

Alternatively, the control module may be configured, when illuminances detected by the first illuminance sensor, the fifth illuminance sensor and the sixth illuminance sensor in a set daytime time zone are all detected as being equal to or less than a set first daytime reference illuminance, to calculate an average illuminance value of a first illuminance value detected by the first illuminance sensor, a fifth illuminance value detected by the fifth illuminance sensor and a sixth illuminance value detected by the sixth illuminance sensor, to determine a light emission brightness of the first divided backlight module based on the calculated average illuminance value, and to control the operation of the first divided backlight module according to the determined light emission brightness.

Alternatively, the control module may be configured to determine whether to operate the first divided backlight module by using a first average value, which is an average of a first illuminance value detected by the first illuminance sensor, a third illuminance value detected by the third illuminance sensor and a fifth illuminance value detected by the fifth illuminance sensor in a set daytime time zone.

In addition, the control module may be configured to control the first to fourth divided backlight modules to be sequentially turned on and off according to a sequential driving sequence set for the first to fourth divided backlight modules in order to extend a usable period of the display panel when a time is in a set late-night time zone, and to control the display panel so that regarding display target information, display information of a late-night display pattern different from that of a daytime time zone is displayed in only a divided display region corresponding to a light-emitting region of any one divided backlight module to be turned on among the first to fourth divided backlight modules, and the display information of the late-night display pattern may be configured to display only a route number, estimated time of arrival, and current location information of a first arriving bus.

According to another aspect of the present invention, the passenger guide device for a bus stop may further include a human body sensing sensor configured to sense a human body around an environment in which the display panel is installed, and the control module may be configured to control the divided backlight modules to emit light at a rest reference brightness set lower than a first reference brightness set for the divided backlight modules when an illuminance detected by the external illuminance detector is determined as being equal to or less than a dark field reference illuminance corresponding to a dark field condition and a human body is not detected by the human body sensor.

Further, the passenger guide device for a bus stop may further include a temperature sensor configured to detect an internal temperature of the display panel, and the control module may be configured to control the divided backlight modules to emit light at a reduced temperature brightness set lower than a first reference brightness set for the divided backlight modules when a temperature detected by the temperature sensor is equal to or higher than a set warning temperature.

Advantageous Effects

The passenger guide device for a bus stop according to the present invention provides an advantage in that it is possible to improve the contrast ratio by independently adjusting the light emission brightnesses of the divided backlight modules, which irradiate light by dividing the display screen region, according to the external illuminance corresponding to the divided regions.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
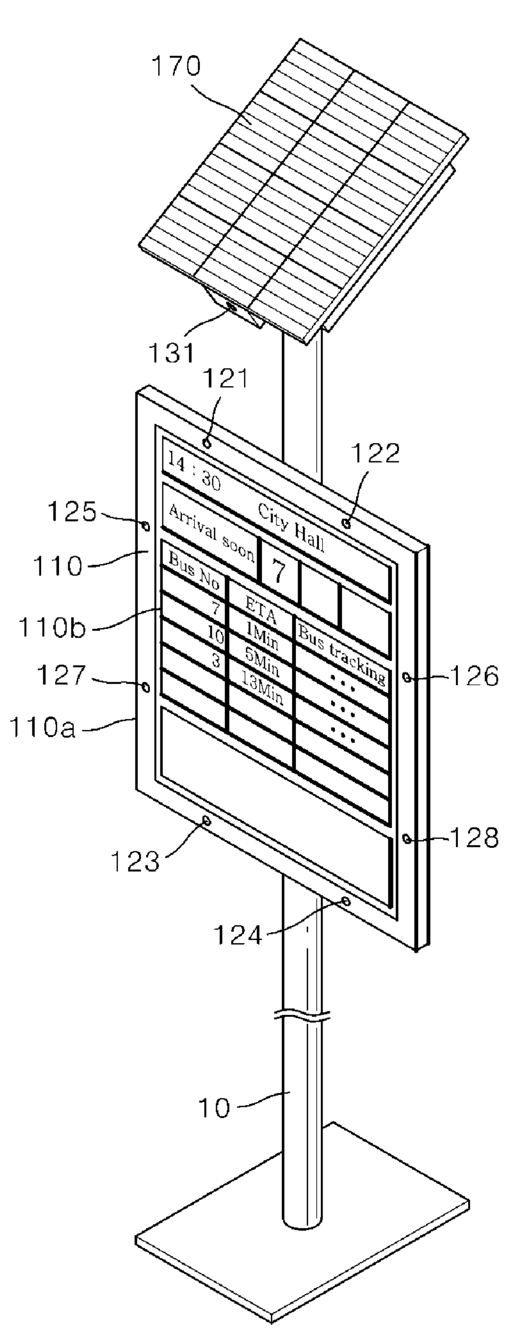
FIG. 1 is a perspective view showing a passenger guide device for a bus stop according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a passenger guide device for a bus stop according to a preferred exemplary embodiment of the present invention will be described in more detail with reference to the accompanying drawings.

Figure 2:
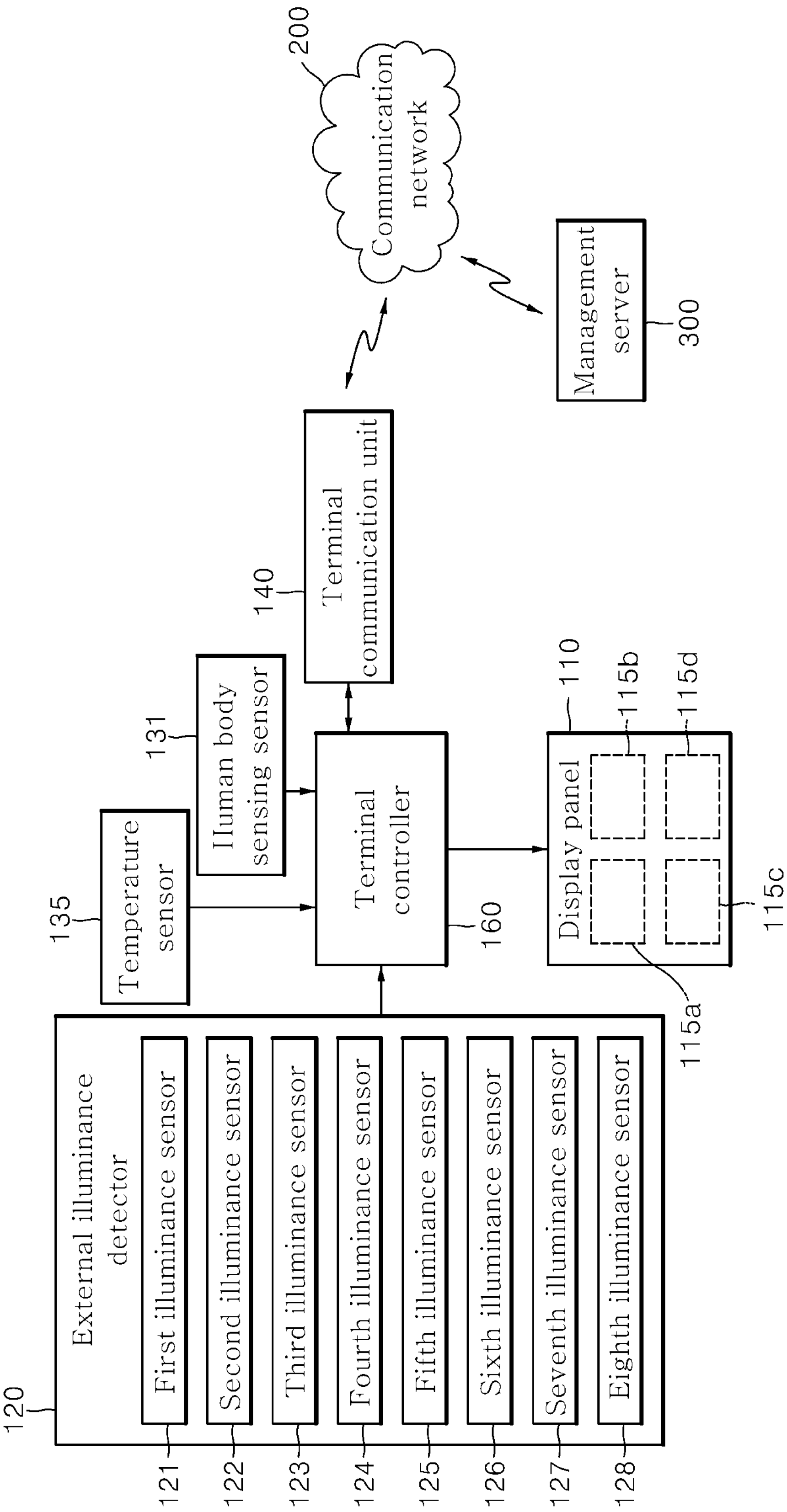
FIG. 2 is a block diagram showing a control system of the passenger guide device for a bus stop of FIG. 1.
Figure 3:
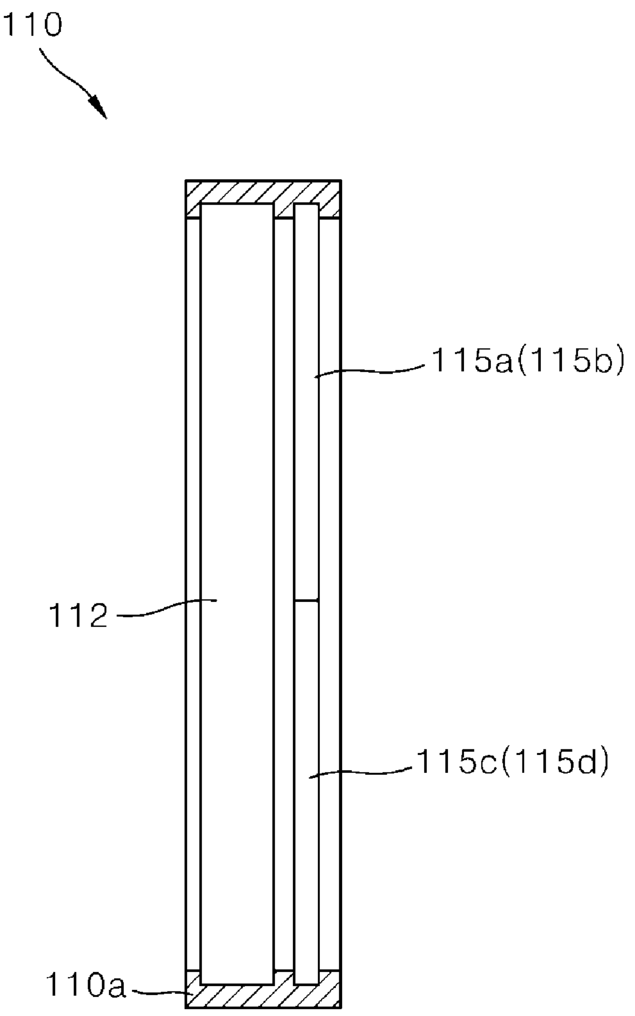
FIG. 3 is a schematic side cross-sectional view of a display panel of FIG. 2.

FIG. 1 is a perspective view showing a passenger guide device for a bus stop according to an exemplary embodiment of the present invention, FIG. 2 is a block diagram showing a control system of the passenger guide device for a bus stop of FIG. 1, and FIG. 3 is a schematic side cross-sectional view of a display panel of FIG. 2.

Referring to FIGS. 1 to 3, a passenger guide device 100 for a bus stop according to an exemplary embodiment of the present invention includes a display panel 110, an external illuminance detector 120, a human body sensing sensor 131, a temperature sensor 135, a terminal communication unit 140 and a terminal controller 160.

The display panel 110 is installed to be supported by a supporting column 10.

The display panel 110 is installed at a bus stop to display bus service display information.

Figure 4:
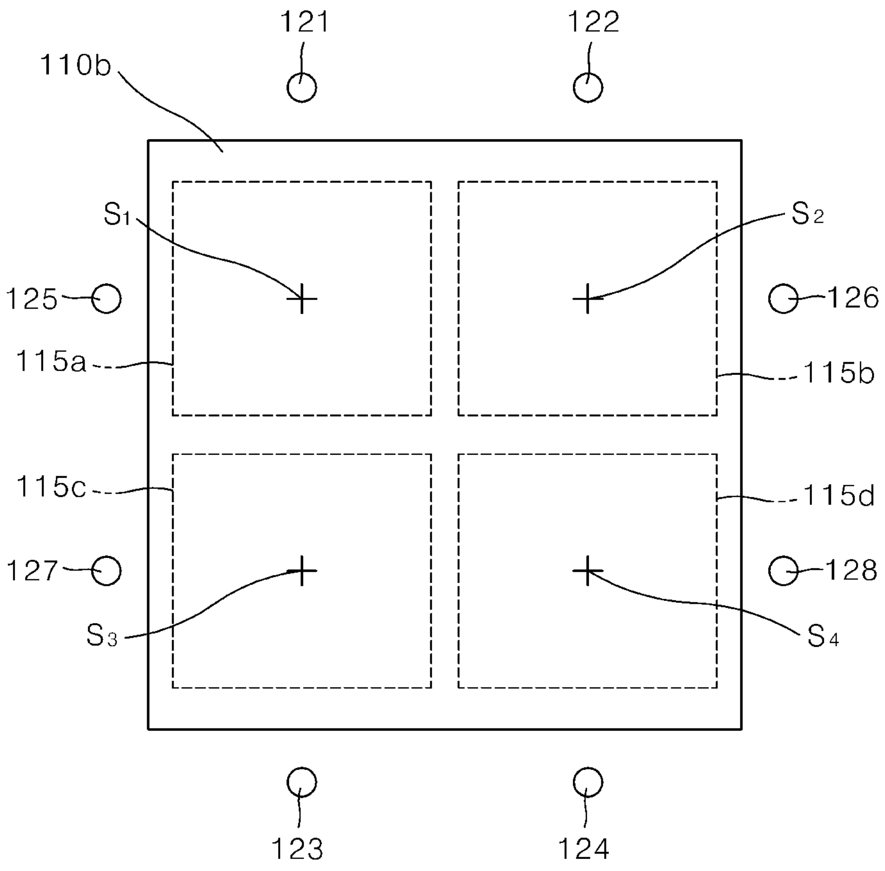
FIG. 4 is a view for illustrating an arrangement relationship between a display screen region of the display panel of FIG. 1 and illuminance sensors.

The display panel 110 is formed to have a display screen region 110*b* within a rectangular support frame 110*a*, and will be described with reference to FIG. 4.

The display panel 110 includes first to fourth divided backlight modules 115*a* to 115*d* each of which is adapted to be able to irradiate light by dividing the display screen region 110*b* into four regions, and a liquid crystal display module 112 that displays display information by light irradiated by the first to fourth divided backlight modules 115*a* to 115*d*. In the shown example, the display screen region 110*b* of the display panel 110 can be divided into an upper left region, an upper right region, a lower left region, and a lower right region for display.

The first divided backlight module 115*a* is responsible for the upper left region of the display screen region 110*b* and irradiates light.

The second divided backlight module 115*b* is responsible for the upper right region of the display screen region 110*b* and irradiates light.

The third divided backlight module 115*c* is responsible for the lower left region of the display screen region 110*b* and irradiates light.

The fourth divided backlight module 115*d* is responsible for the lower right region of the display screen region 110*b* and irradiates light.

The liquid crystal display module 112 is of a type supporting both reflection and transmission capable of displaying display information by light incident during the daytime even when the first to fourth divided backlight modules 115*a* to 115*d* are turned off, and the detailed structure thereof is well known, so a detailed description thereof will be omitted.

The external illuminance detector 120 includes first to eighth illuminance sensors 121 to 128 that are installed spaced apart from each other along the rectangular support frame 110*a*, which is an edge region outside the display screen region 110*b* of the display panel 110, and detect the external illuminance, and will be described with reference to FIG. 4.

The first to eighth illuminance sensors 121 to 128 are applied to acquire external illuminance information for each divided region for use in independently controlling light emission conditions for each of the four divided display screen regions 110*b*.

The first illuminance sensor 121 is installed at a vertically corresponding position along a center S1 of the first divided backlight module 115*a*, in an upper edge region of the display panel 110. That is, the first illuminance sensor 121 is installed in the upper edge region of the display panel 110 on a vertical extension line extending vertically from the center S1 of the first divided backlight module 115*a*.

The second illuminance sensor 122 is installed at a vertically corresponding position along a center S2 of the second divided backlight module 115*b*, in an upper edge region of the display panel 110. Likewise, the second illuminance sensor 122 is installed in the upper edge region of the display panel 110 on a vertical extension line extending vertically from the center S2 of the second divided backlight module 115*b*.

The third illuminance sensor 123 is installed at a vertically corresponding position along a center S3 of the third divided backlight module 115*c*, in a lower edge region of the display panel 110. That is, the third illuminance sensor 123 is installed in the lower edge region of the display panel 110 on a vertical extension line extending vertically from the center S3 of the third divided backlight module 115*c*.

The fourth illuminance sensor 124 is installed at a vertically corresponding position along a center S4 of the fourth divided backlight module 115*d*, in a lower edge region of the display panel 110. Likewise, the fourth illuminance sensor 124 is installed in the lower edge region of the display panel 110 on a vertical extension line extending vertically from the center S4 of the fourth divided backlight module 115*d*.

The fifth illuminance sensor 125 is installed at a horizontally corresponding position along the center S1 of the first divided backlight module 115*a*, in a left edge region of the display panel 110. That is, the fifth illuminance sensor 125 is installed in the left edge region of the display panel 110 on a horizontal extension line extending horizontally from the center S1 of the first divided backlight module 115*a*.

The sixth illuminance sensor 126 is installed at a horizontally corresponding position along the center S2 of the second divided backlight module 115*b*, in a right edge region of the display panel 110.

The seventh illuminance sensor 127 is installed at a horizontally corresponding position along the center S3 of the third divided backlight module 115*c*, in a left edge region of the display panel 110.

The eighth illuminance sensor 128 is installed at a horizontally corresponding position along the center S4 of the fourth divided backlight module 115*d*, in a right edge region of the display panel 110.

The first to eighth illuminance sensors 121 to 128 each provide the detected illuminance to the terminal controller 160.

The human body sensing sensor 131 detects a human body around the environment in which the display panel 110 is installed, and provides the detected information to the terminal controller 160.

The temperature sensor 135 is installed to detect an internal temperature of the display panel 110, and provides the detected temperature to the terminal controller 160. The temperature sensor 135 is used to perceive operating environment information for preventing the life of the first to fourth divided backlight modules 115*a* to 115*d* from being shortened due to an excessive temperature rise during an operation.

The terminal communication unit 140 provides the received information to the terminal controller 160, and is controlled by the terminal controller 160 to transmit transmission target information to a management server 300 via a communication network 200.

In order to alleviate installation restrictions, a wireless communication module for performing wireless communication is preferably applied to the terminal communication unit 140.

The terminal controller 160 controls the display panel 110 so that bus service display information received through the terminal communication unit 140 is displayed on the display panel 110.

Here, the bus service display information may include a route number of a bus in service, an estimated time of arrival at a bus stop, and a current location of a bus.

In addition, the terminal controller 160 may be configured to display various additional information such as current time, bus stop location information, and advertisement information on the display panel 110.

Arrangement positions for each item of the display information that is displayed by the terminal controller 160 may be variously applied.

The terminal controller 160 controls operations of the first to fourth divided backlight modules 115*a* to 115*d* according to the illuminance detected by the external illuminance detector 120.

If the illuminance detected by the external illuminance detector 120 exceeds a first daytime reference illuminance, the terminal controller 160 determines a daytime mode, and operates so that the display information is displayed on the display panel 110 by outside light in a state in which the first to fourth divided backlight modules 115*a* to 115*d* are not operating.

Unlike this, the terminal controller 160 may be configured to determine the daytime mode when a time is in a set daytime time zone.

The terminal controller 160 may be configured, if the illuminances detected by the first illuminance sensor 121, the second illuminance sensor 122, the fifth illuminance sensor 125, and the sixth illuminance sensor 126 in the set daytime time zone are all detected as being equal to or less than the set first daytime reference illuminance, to determine light emission brightnesses of the first and second divided backlight modules 115*a* and 116*b*, based on a lower average illuminance value, which is an average value of two lowest luminance values of the first illuminance value detected by the first illuminance sensor 121, the second illuminance value detected by the second illuminance sensor 122, the fifth illuminance value detected by the fifth illuminance sensor 125 and the sixth illuminance value detected by the sixth illuminance sensor 126, and to control the operations of the first and second divided backlight modules 115*a* and 115*b* according to the determined light emission brightnesses.

Here, the light emission brightnesses of the first and second divided backlight modules 115*a* and 115*b* may be determined as brightnesses required for the lower average illuminance value to reach the set daytime reference target value. In addition, the daytime time zone may be set to a time zone in which information is sufficiently displayed by sunlight, and may be applied differently for each season and date. For example, in May, 8:00 am to 6:00 pm may be set as the daytime time zone.

Likewise, the terminal controller 160 may be configured, if the illuminances detected by the third illuminance sensor 123, the fourth illuminance sensor 124, the seventh illuminance sensor 127, and the eighth illuminance sensor 128 in the set daytime time zone are all detected as being equal to or less than the set first daytime reference illuminance, to determine light emission brightnesses of the third and fourth divided backlight modules 115*c* and 115*d*, based on a lower average illuminance value, which is an average value of two lowest luminance values of the third illuminance value detected by the third illuminance sensor 123, the fourth illuminance value detected by the fourth illuminance sensor 124, the seventh illuminance value detected by the seventh illuminance sensor 127 and the eighth illuminance value detected by the eighth illuminance sensor 128, and to control the operations of the third and fourth divided backlight modules 115*c* and 115*d* according to the determined light emission brightnesses.

Unlike this, the terminal controller 160 may be configured to determine driving of the first divided backlight module 115*a* by using the illuminance information of the first illuminance sensor 121, the fifth illuminance sensor 125, and the sixth illuminance sensor 126, and driving of the second divided backlight module 115*b* by using the illuminance information of the second illuminance sensor 122, the fifth illuminance sensor 125, and the sixth illuminance sensor 126.

Likewise, the terminal controller 160 may be configured to determine driving of the third divided backlight module 115*c* by using the illuminance information of the third illuminance sensor 123, the seventh illuminance sensor 127, and the eighth illuminance sensor 128, and driving of the fourth divided backlight module 115*d* by using the illuminance information of the fourth illuminance sensor 124, the seventh illuminance sensor 127, and the eighth illuminance sensor 128.

In this case, the terminal controller 160 may be configured, if the illuminances detected by the first illuminance sensor 121, the fifth illuminance sensor 125, and the sixth illuminance sensor 126 in the set daytime time zone are all detected as being equal to or less than the set first daytime reference illuminance, to calculate an average illuminance value of the first illuminance value detected by the first illuminance sensor 121, the fifth illuminance value detected by the fifth illuminance sensor 125, and the sixth illuminance value detected by the sixth illuminance sensor 126, to determine a light emission brightness of the first divided backlight module 115*a* required to reach the daytime reference target value described above, based on the calculated average illuminance value, and to control the operation of the first divided backlight module 115*a* according to the determined light emission brightness.

Alternatively, the terminal controller 160 may be configured to determine driving of the first divided backlight module 115*a* by using the illuminance information of the first illuminance sensor 121, the third illuminance sensor 123, and the fifth illuminance sensor 125, and driving of the second divided backlight module 115*b* by using the illuminance information of the second illuminance sensor 122, the fourth illuminance sensor 124, and the sixth illuminance sensor 126.

Likewise, the terminal controller 160 may be configured to determine driving of the third divided backlight module 115*c* by using the illuminance information of the first illuminance sensor 121, the third illuminance sensor 123, and the seventh illuminance sensor 127, and driving of the fourth divided backlight module 115*d* by using the illuminance information of the second illuminance sensor 122, the fourth illuminance sensor 124, and the eighth illuminance sensor 128.

In this case, the terminal controller 160 may be configured to determine whether to operate the first divided backlight module 115*a* by using a first average value, which is an average of the first illuminance value detected by the first illuminance sensor 121, the third illuminance value detected by the third illuminance sensor 123, and the fifth illuminance value detected by the fifth illuminance sensor 125 in the daytime time zone.

Likewise, the terminal controller 160 may be configured to determine whether to operate the second divided backlight module 115*b* by using a second average value, which is an average of the second illuminance value detected by the second illuminance sensor 122, the fourth illuminance value detected by the fourth illuminance sensor 124, and the sixth illuminance value detected by the sixth illuminance sensor 126 in the daytime time zone. The method of determining the light emission brightness using the average value may also be equally applied to the third and fourth divided backlight modules 115*c* and 115*d*.

The terminal controller 160 controls the liquid crystal display module 112 to display all the bus service status traffic information, such as a current time, bus stop location information, a route number of a bus in service, an expected time of arrival at a bus stop, and a current location of a bus, which are display target information in the daytime time zone.

In addition, the terminal controller 160 controls the first to fourth divided backlight modules 115*a* to 115*d* to operate according to the operating conditions when it is determined that an illuminance detected by the external illuminance detector 120 in a set nighttime time zone is equal to or less than a set nighttime reference illuminance and a time does not correspond to a blocking time. Here, the nighttime time zone may be a time between the set daytime time zone and a late-night time described later. As an example, in May, 6:00 pm to 10:00 pm may be applied as the nighttime time zone.

Meanwhile, considering that the life and extension of a use period of the display panel 110 are mainly related to the cumulative operation time of the first to fourth divided backlight modules 115*a* to 115*d* and the brightness during an operation, the terminal controller 160 is configured to operate the display panel 110 by changing the operating conditions of the divided backlight modules 115*a* to 115*d* to driving conditions for extending the use period at late night when the number of persons who uses a bus stop is relatively small.

As an example, the terminal controller 160 may be configured to control the first to fourth divided backlight modules 115*a* to 115*d* to be sequentially turned on and off according to a sequential driving sequence set for the first to fourth divided backlight modules 115*a* to 115*d* so that the usable period of the display panel 110 can be extended when a time is in the set late-night time zone. Here, the sequential driving sequence refers to circular driving in which one of the first to fourth divided backlight modules 115*a* to 115*d* is turned on and the others are turned off according to an order set for the first to fourth divided backlight modules.

That is, when a time is in the late-night time zone, the terminal controller 160 controls only the first divided backlight module 115*a* among the first to fourth divided backlight modules 115*a* to 115*d* to be turned on and the remaining second to fourth divided backlight modules 115*b* to 115*d* to be turned off, and in a next sequence, the terminal controller 160 controls only the second divided backlight module 115*b* to be turned on and the remaining first, third, and fourth divided backlight modules 115*a*, 115*c* and 115*d* to be turned off. That is, the terminal control may control the backlight modules in a circular manner while applying the processes sequentially according to the set sequence order.

Here, the late-night time zone may be appropriately applied according to the installation environments, such as from 22:00 pm to a closing time of bus service.

Figure 5:
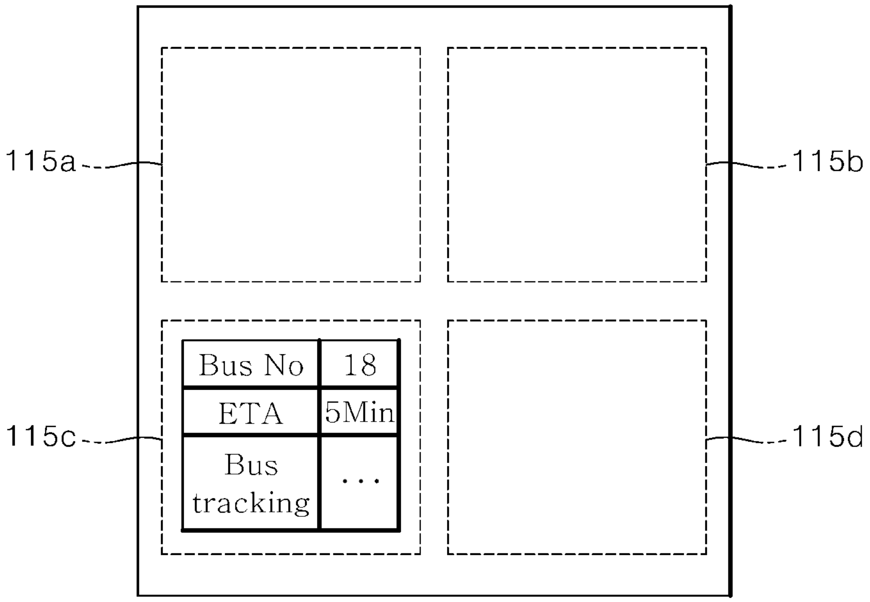
FIG. 5 is a view showing an example of a display information change pattern through a display panel according to an exemplary embodiment of the present invention.

In addition, the terminal controller 160 controls the liquid crystal display module 112 to control display target information so that, when controlling the first to fourth divided backlight modules 115*a* to 115*d* to be sequentially turned on and off according to the sequential driving sequence set for the first to fourth divided backlight modules 115*a* to 115*d* in the late-night time, display information of a late-night display pattern different from a daytime time zone is displayed in only a divided display region corresponding to a light-emitting region of any one divided backlight module (115*a* to 115*d*) to be turned on. As an example, in the sequential driving sequence mode, as shown in FIG. 5, the terminal controller 160 may be configured to display, as the display information of the late-night display pattern, only a route number, estimated time of arrival, and current location information of the first arriving bus at a time when the third divided backlight module 115*c* corresponding to the third sequence is turned on. This process can enable only main display information to be displayed in a corresponding display region even at a time when the divided backlight module 115*d* corresponding to a next sequence is turned on.

Unlike this, the terminal controller may be configured such that the display information is displayed in a pattern of repeatedly displaying main display information, which includes a route number, estimated time of arrival, and current location information of a first arriving bus at a time when the divided backlight module 115*c* corresponding to a lighting sequence is turned on, and sub-display information, which includes a route number, estimated time of arrival, and current location information of a next arriving bus, in a staggered manner.

Meanwhile, the terminal controller 160 may be configured to control the first to fourth divided backlight modules 115*a* to 115*d* to emit light at a rest reference brightness set lower than the first reference brightness set for the first to fourth divided backlight modules 115*a* to 115*d* when the illuminance detected by the external illuminance detector 120 is equal to or less than a dark field reference illuminance corresponding to a dark field condition and a human body is not detected by the human body sensor 130.

In addition, the terminal controller 160 may be configured to control the first to fourth divided backlight modules 115*a* to 115*d* not to emit light during the set blocking time, even when the illuminance detected by the external illuminance detector 120 is equal to or less than the dark field reference illuminance corresponding to the dark field condition.

Here, the blocking time may be set to a time zone in which buses are not in service.

In addition, the terminal controller 160 may be configured to control the divided backlight modules 115*a* to 115*d* to emit light at a reduced temperature brightness set lower than the first reference brightness set for the divided backlight modules 115*a* to 115*d* when a temperature detected by the temperature sensor 125 is equal to or higher than a set warning temperature.

The terminal communication unit 140 and the terminal controller 160 correspond to the control module.

A solar cell module 170 is installed on the supporting column 10, and is configured to generate power by the incident sunlight and to enable the power to be used as operating power for the passenger guide device 100 for a bus stop. The solar cell module may be omitted.

The passenger guide device 100 for a bus stop described above provides an advantage in that it is possible to improve the contrast ratio by independently adjusting the light emission brightnesses of the divided backlight modules, which irradiate light by dividing the display screen region, according to the external illuminance corresponding to the divided regions.

EXPLANATION OF REFERENCES

| | |
|---|---|
| 110: Display panel | 120: External illuminance detector |
| 131: Human body sensing sensor | 140: Terminal communication unit |
| 160: Terminal controller | 170: Solar cell module |

What is claimed is:

1. A passenger guide device for a bus stop comprising:

a display panel installed at the bus stop and comprising divided backlight modules configured to be able to irradiate light by dividing a display screen region, and a liquid crystal display module configured to display bus service display information by the light irradiated from the divided backlight modules;

an external illuminance detector comprising a plurality of illuminance sensors installed spaced apart from each other along an edge outside the display screen region of the display panel and configured to detect external illuminance; and a control module configured to control the display panel so that the bus service display information coming from a management server and being received through a terminal communication unit is displayed on the display panel, and to control operations of the divided backlight modules according to the illuminance detected by the external illuminance detector;

wherein the display panel comprises a first divided backlight module responsible for an upper left region among four regions divided into an upper left region, an upper right region, a lower left region, and a lower right region with respect to the display screen region, a second divided backlight module responsible for the upper right region, a third divided backlight module responsible for the lower left region, and a fourth divided backlight module responsible for the lower right region; and wherein the plurality of illuminance sensors comprise:

a first illuminance sensor installed at a vertically corresponding position along a center of the first divided backlight module, in an upper edge region of the display panel;

a second illuminance sensor installed at a vertically corresponding position along a center of the second divided backlight module, in an upper edge region of the display panel;

a third illuminance sensor installed at a vertically corresponding position along a center of the third divided backlight module, in a lower edge region of the display panel;

a fourth illuminance sensor installed at a vertically corresponding position along a center of the fourth divided backlight module, in a lower edge region of the display panel;

a fifth illuminance sensor installed at a horizontally corresponding position along the center of the first divided backlight module, in a left edge region of the display panel;

a sixth illuminance sensor installed at a horizontally corresponding position along the center of the second divided backlight module, in a right edge region of the display panel;

a seventh illuminance sensor installed at a horizontally corresponding position along the center of the third divided backlight module, in a left edge region of the display panel; and an eighth illuminance sensor installed at a horizontally corresponding position along the center of the fourth divided backlight module, in a right edge region of the display panel.

2. The passenger guide device for a bus stop according to claim 1, wherein the control module is configured, when illuminances detected by the first illuminance sensor, the second illuminance sensor, the fifth illuminance sensor and the sixth illuminance sensor in a set daytime time zone are all detected as being equal to or less than a set first daytime reference illuminance, to determine light emission brightnesses of the first and second divided backlight modules, based on a lower average illuminance value, which is an average value of two lowest luminance values of a first illuminance value detected by the first illuminance sensor, a second illuminance value detected by the second illuminance sensor, a fifth illuminance value detected by the fifth illuminance sensor and a sixth illuminance value detected by the sixth illuminance sensor, and to control the operations of the first and second divided backlight modules according to the determined light emission brightnesses.

3. The passenger guide device for a bus stop according to claim 1, wherein the control module is configured, when illuminances detected by the first illuminance sensor, the fifth illuminance sensor and the sixth illuminance sensor in a set daytime time zone are all detected as being equal to or less than a set first daytime reference illuminance, to calculate an average illuminance value of a first illuminance value detected by the first illuminance sensor, a fifth illuminance value detected by the fifth illuminance sensor and a sixth illuminance value detected by the sixth illuminance sensor, to determine a light emission brightness of the first divided backlight module based on the calculated average illuminance value, and to control the operation of the first divided backlight module according to the determined light emission brightness.

4. The passenger guide device for a bus stop according to claim 1, wherein the control module is configured to determine whether to operate the first divided backlight module by using a first average value, which is an average of a first illuminance value detected by the first illuminance sensor, a third illuminance value detected by the third illuminance sensor and a fifth illuminance value detected by the fifth illuminance sensor in a set daytime time zone.

5. The passenger guide device for a bus stop according to claim 1, wherein the control module is configured to control the first to fourth divided backlight modules to be sequentially turned on and off according to a sequential driving sequence set for the first to fourth divided backlight modules in order to extend a usable period of the display panel when a time is in a set late-night time zone, and to control the display panel so that regarding display target information, display information of a late-night display pattern different from that of a daytime time zone is displayed in only a divided display region corresponding to a light-emitting region of any one divided backlight module to be turned on among the first to fourth divided backlight modules, and the display information of the late-night display pattern is configured to display only a route number, estimated time of arrival, and current location information of a first arriving bus.

6. The passenger guide device for a bus stop according to claim 1, further comprising a human body sensing sensor configured to sense a human body around an environment in which the display panel is installed, wherein the control module is configured to control the divided backlight modules to emit light at a rest reference brightness set lower than a first reference brightness set for the divided backlight modules when an illuminance detected by the external illuminance detector is determined as being equal to or less than a dark field reference illuminance corresponding to a dark field condition and a human body is not detected by the human body sensor.

7. The passenger guide device for a bus stop according to claim 1, further comprising a temperature sensor configured to detect an internal temperature of the display panel, wherein the control module is configured to control the divided backlight modules to emit light at a reduced temperature brightness set lower than a first reference brightness set for the divided backlight modules when a temperature detected by the temperature sensor is equal to or higher than a set warning temperature.

8. A passenger guide device for a bus stop comprising:

a display panel installed at the bus stop and comprising divided backlight modules configured to be able to irradiate light by dividing a display screen region, and a liquid crystal display module configured to display bus service display information by the light irradiated from the divided backlight modules;

an external illuminance detector comprising a plurality of illuminance sensors installed spaced apart from each other along an edge outside the display screen region of the display panel and configured to detect external illuminance;

a control module configured to control the display panel so that the bus service display information coming from a management server and being received through a terminal communication unit is displayed on the display panel, and to control operations of the divided backlight modules according to the illuminance detected by the external illuminance detector; and a human body sensing sensor configured to sense a human body around an environment in which the display panel is installed;

wherein the control module is configured to control the divided backlight modules to emit light at a rest reference brightness set lower than a first reference brightness set for the divided backlight modules when an illuminance detected by the external illuminance detector is determined as being equal to or less than a dark field reference illuminance corresponding to a dark field condition and a human body is not detected by the human body sensor.

9. A passenger guide device for a bus stop comprising:

a display panel installed at the bus stop and comprising divided backlight modules configured to be able to irradiate light by dividing a display screen region, and a liquid crystal display module configured to display bus service display information by the light irradiated from the divided backlight modules;

an external illuminance detector comprising a plurality of illuminance sensors installed spaced apart from each other along an edge outside the display screen region of the display panel and configured to detect external illuminance;

a control module configured to control the display panel so that the bus service display information coming from a management server and being received through a terminal communication unit is displayed on the display panel, and to control operations of the divided backlight modules according to the illuminance detected by the external illuminance detector; and a temperature sensor configured to detect an internal temperature of the display panel;

wherein the control module is configured to control the divided backlight modules to emit light at a reduced temperature brightness set lower than a first reference brightness set for the divided backlight modules when a temperature detected by the temperature sensor is equal to or higher than a set warning temperature.

* * * * *